US008622294B1

(12) United States Patent
Meyers

(10) Patent No.: US 8,622,294 B1
(45) Date of Patent: Jan. 7, 2014

(54) METHOD AND APPARATUS FOR ELECTRONICALLY ORGANIZING TRANSPORT DOCUMENTS

(75) Inventor: Richard C. Meyers, Longboat Key, FL (US)

(73) Assignee: GlobalTrak, LLC, Arlington, VA (US)

( * ) Notice: Subject to any disclaimer, the term of this patent is extended or adjusted under 35 U.S.C. 154(b) by 22 days.

(21) Appl. No.: 13/425,710

(22) Filed: Mar. 21, 2012

Related U.S. Application Data

(60) Provisional application No. 61/454,598, filed on Mar. 21, 2011.

(51) Int. Cl.
*G07B 15/02* (2011.01)
(52) U.S. Cl.
USPC .......................................... 235/384; 235/375
(58) Field of Classification Search
USPC .................................. 235/375, 384
See application file for complete search history.

(56) References Cited

U.S. PATENT DOCUMENTS 7,278,568 B2 * 10/2007 Kadaba .......................... 235/375
7,350,694 B2 * 4/2008 Burgess ......................... 235/375

\* cited by examiner

*Primary Examiner* — Jamara Franklin

(57) ABSTRACT

A system and apparatus is provided for managing the collection, preparation, and storage of shipping documentation. According to a preferred embodiment, the present invention includes multiple sensors, a processing system and a control unit for organizing and transporting shipping documents for multiple shipments in a real-time tracking system. The shipping document management system of the present invention travels and arrives with the actual shipment and allows the user to collect information and produce documents for viewing, scanning, transmitting and/or printing. The present invention may function as a universal open architecture envelope capable of linking to existing container sensor systems.

12 Claims, 5 Drawing Sheets

METHOD AND APPARATUS FOR ELECTRONICALLY ORGANIZING TRANSPORT DOCUMENTS

BACKGROUND AND FIELD OF THE PRESENT INVENTION

1. Field of the Present Invention

The present invention relates generally to a system for tracking shipping containers and organizing transport documentation. More particularly, the present invention provides an apparatus for organizing shipping documents in which an envelope of information applied to a cargo transport container contains information from multiple sensors and multiple shipments which are shipped together and in which all documentation is fully viewable.

2. Background of the Invention

When shipping a product, the shipper must be aware of packing, labeling, documentation, and insurance requirements. It is important that shippers ensure that the merchandise is packed correctly so that it arrives in good condition and labeled correctly to ensure that the goods are handled properly and delivered promptly. Shipments must be documented correctly to meet U.S. and foreign government requirements as well as proper collection standards. Freight must also be insured against damage, loss, pilferage and delay.

Most exporters rely on an international freight forwarder to perform these services because of the multitude of considerations involved in physically exporting goods. An international freight forwarder is an agent for the exporter in moving cargo to an overseas destination. These agents are familiar with the import rules and regulations of foreign countries, the export regulations of the U.S. government, the methods of shipping, and the documents related to foreign trade. Export freight forwarders are licensed by the International Air Transport Association (IATA) to handle air freight and the Federal Maritime Commission to handle ocean freight.

Freight forwarders assist exporters in preparing price quotations and providing advice on freight costs, port charges, consular fees, costs of special documentation, insurance costs, and their handling fees. They recommend the packing methods that will protect the merchandise during transit or can arrange to have the merchandise packed at the port or containerized. If the exporter prefers, freight forwarders can reserve the necessary space on a vessel, aircraft, train, or truck.

Once the order is ready for shipment, freight forwarders should review all documents to ensure that everything is in order. This is of particular importance with letter of credit payment terms. They may also prepare the bill of lading and any special required documentation. After shipment, they can route the documents to the seller, the buyer, or to a paying bank.

Freight forwarders can also make arrangements with customs brokers overseas to ensure that the goods comply with customs export documentation regulations. A customs broker is an individual or company that is licensed to transact customs business on behalf of others. Customs business is limited to those activities involving transactions related to the entry and admissibility of merchandise; its classification and valuation. A customs valuation of shipment also includes the payment of duties, taxes, or other charges assessed or collected or the refund, rebate, or drawback thereof.

The following documents are commonly used in exporting; but which of them are necessary in a particular transaction depends on the requirements of the U.S. government and the government of the importing country.

Air freight shipments are handled by air waybills, which can never be made in negotiable form.

A bill of lading is a contract between the owner of the goods and the carrier (as with domestic shipments). For vessels, there are two types: a straight bill of lading which is nonnegotiable and a negotiable or shipper's order bill of lading. The latter can be bought, sold, or traded while the goods are in transit. The customer usually needs an original as proof of ownership to take possession of the goods.

A commercial invoice is a bill for the goods from the seller to the buyer. These invoices are often used by governments to determine the true value of goods when assessing customs duties. Governments that use the commercial invoice to control imports will often specify its form, content, copies, language to be used, and other characteristics.

A consular invoice is a document that is required in some countries. It describes the shipment of goods and shows information such as the consignor, consignee, and value of the shipment. Certified by the consular official of the foreign country stationed here, it is used by the country's customs officials to verify the value, quantity, and nature of the shipment.

A certificate of origin is a document that is required in certain nations. It is a signed statement as to the origin of the export item. Certificate of origin are usually signed through a semiofficial organization, such as a local chamber of commerce. A certificate may still be required even if the commercial invoice contains the information.

A NAFTA certificate of origin is required for products traded among the NAFTA countries (Canada, the United States, and Mexico).

Inspection certification is required by some purchasers and countries in order to attest to the specifications of the goods shipped. This is usually performed by a third party and often obtained from independent testing organizations.

A dock receipt and a warehouse receipt are used to transfer accountability when the export item is moved by the domestic carrier to the port of embarkation and left with the ship line for export.

A destination control statement appears on the commercial invoice, and ocean or air waybill of lading to notify the carrier and all foreign parties that the item can be exported only to certain destinations.

A Shipper's Export Declaration (SED) is used to control exports and act as a source document for official U.S. export statistics. SEDs must be prepared for shipments through the U.S. Postal Service when the shipment is valued over $500. SEDs are required for shipments not using the U.S. Postal Service when the value of the commodities, classified under any single Schedule B number, is over $2,500. SEDs must be prepared, regardless of value, for all shipments requiring an export license or destined for countries restricted by the Export Administration Regulations (see Chapter 9). SEDs are prepared by the exporter or the exporter's agent and delivered to the exporting carrier (for example, the post office, airline, or vessel line). The exporting carrier will present the required number of copies to the U.S. Customs Service at the port of export. Often, the SED is prepared as a by-product of another document, the Shipper's Letter of Instructions.

An export license is a government document that authorizes the export of specific goods in specific quantities to a particular destination. This document may be required for most or all exports to some countries or for other countries only under special circumstances.

An export packing list is considerably more detailed and informative than a standard domestic packing list. It itemizes the material in each individual package and indicates the type of package, such as a box, crate, drum, or carton. It also shows the individual net, legal, tare, and gross weights and measurements for each package (in both U.S. and metric systems). Package markings should be shown along with the shipper's and buyer's references. The list is used by the shipper or forwarding agent to determine the total shipment weight and volume and whether the correct cargo is being shipped. In addition, U.S. and foreign customs officials may use the list to check the cargo.

An insurance certificate is used to assure the consignee that insurance will cover the loss of or damage to the cargo during transit.

Documentation must be precise because slight discrepancies or omissions may prevent merchandise from being exported, result in nonpayment, or even result in the seizure of the exporter's goods by U.S. or foreign government customs. Collection documents are subject to precise time limits and may not be honored by a bank if the time has expired. Most documentation is routine for freight forwarders and customs brokers, but the exporter is ultimately responsible for the accuracy of its documents. The number and kind of documents the exporter must deal with varies depending on the destination of the shipment. Because each country has different import regulations, the exporter must be careful to provide all proper documentation.

3. Description of Related Art

Presently, document tracking is transacted via computer systems which employ software programs capable of collating package level detail, scanning items and comparing them to the sales order or picking document. This shipping document management systems of the prior art benefits Business to Business (B2B) transactions such as: quoting freight rates while taking an order; posting freight charges to the sales order; creating packing lists by package and order; printing certified labels while handling the package; uploading electronic manifests; sending a detailed E-Mail with tracking numbers and package contents to the customer at time of shipment.

The prior art system of document management ultimately serves to track packages and shipments from within the business system. It is useful when reconciling freight invoices and generating Bills of Lading and Advanced Shipment Notices (ASN). However, when a shipment includes packages from multiple shippers each with separate shipping documentation, the document management system of the prior art creates complex problems for the carrier related to real-time tracking, organizing and viewing all document folders, reviewing and verifying packing list and quickly reconciling discrepancies.

SUMMARY OF THE PRESENT INVENTION

To address the shortcomings presented in the prior art, a system and apparatus is provided for managing the collection, preparation, and storage of shipping documentation. According to a preferred embodiment, the present invention includes multiple sensors, a processing system and a control unit for organizing and transporting shipping documents for multiple shipments in a real-time tracking system. The shipping document management system of the present invention travels and arrives with the actual shipment and allows the user to collect information and produce documents for viewing, scanning, transmitting and/or printing. The present invention may function as a universal open architecture envelope capable of linking to existing container sensor systems.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
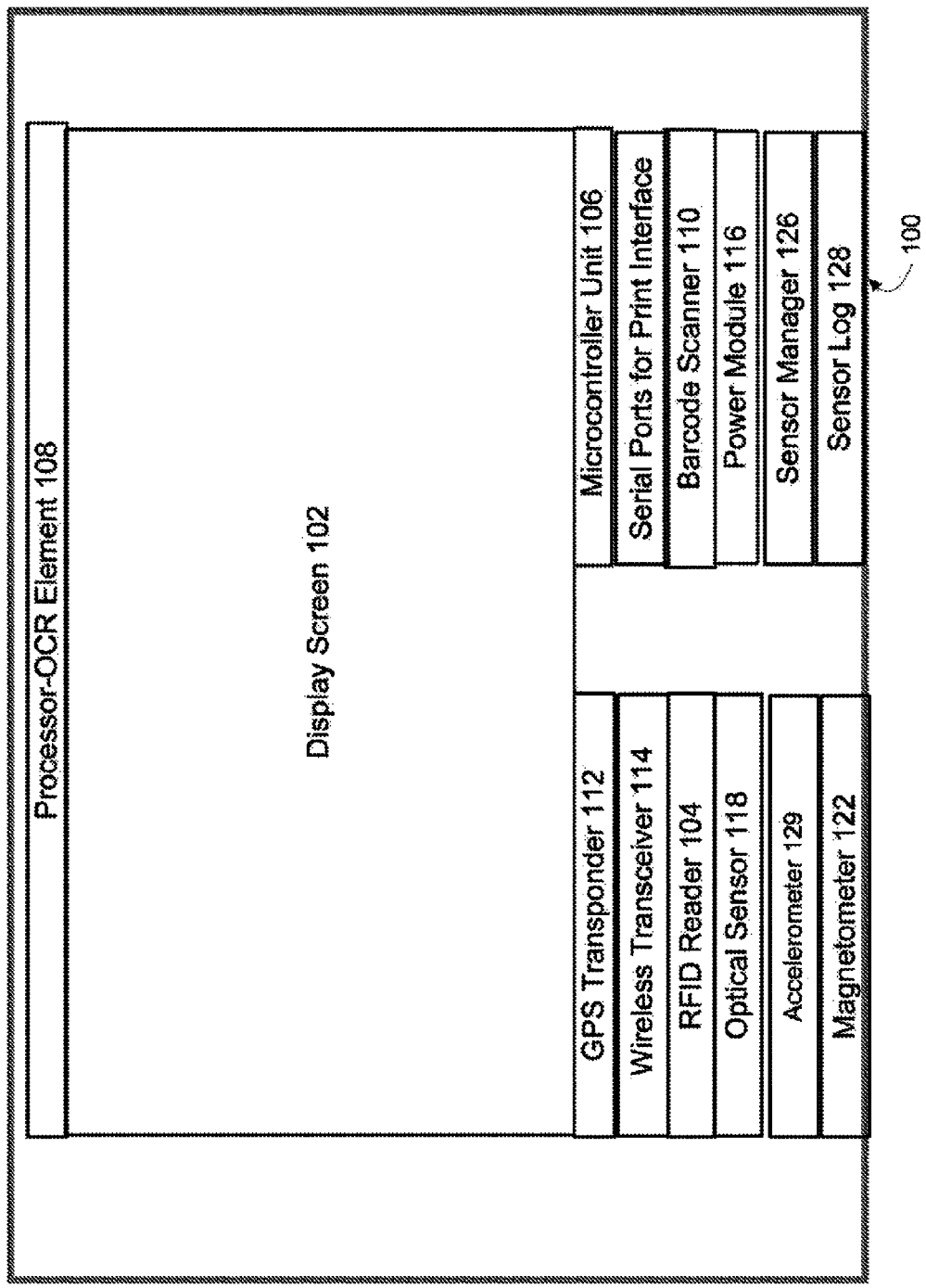
FIG. 1 is a block diagram of the processing, sensing, communicating and displaying components in accordance with an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

With reference now to FIG. 1, a block diagram of the processing, sensing, communicating and displaying components in accordance with an embodiment of the present invention will now be discussed. As shown in FIG. 1, the present invention provides a platform for collecting and organizing shipping documents which includes a Processor-OCR element 108, a RFID reader 104, a barcode scanner 110, a wireless transceiver element 114 and a microcontroller unit 106. Preferably, the Processor-OCR element 108 may include an external scanner for inputting and updating documentation capable of recognizing and integrating any form of document regardless of the format, language and any other variables. Also preferably, the barcode scanner 110 of the present invention can access the network elements of the microcontroller unit 106 to run applications for Universal Barcode Identification. Preferably, the RFID reader 104 of the present invention may be capable of querying all passive, semi-passive and active RFID tags.

As also shown in FIG. 1, the sensing system of the present invention consists of environmental sensors such as an external optical sensor 118, a 3-axis accelerometer 120 and a magnetometer 122. Additionally, the sensing system includes a geolocation transponder 112 which may include assisted GPS, Wi-Fi location databases, and cellular network locators. Preferably, the present invention may track shipping by package while en route and provide real-time geolocation information via a remote monitoring station.

Preferably, the present invention includes circuitry to continuously monitor the sensor and capture the highest amplitude signal over a determined, short time interval. Thereafter, as signals are detected, it is preferred that a sensor manager 126 is provided to sample the measured values or cumulative values once per programmed interval and thereafter, and to provide the sampled results for further processing and analysis by processing system 106 of the present invention. Together the sensors of the present invention provide continuous monitoring of environmental conditions. Preferably, each of these should be designed to be adjusted to suit particular applications. Data from these sensors is processed, stored and acted upon by the processing system of the present invention as discussed in detail below.

Displaying System

As shown in FIG. 1, the display screen 102 of the present invention preferably may be made of durable housing and with high resolution pixels and backlighting. Preferably, the display screen may be manipulated by a multitouch display, pressure triggered stylus or onscreen keyboard. Device may be managed and synced by a Remote Monitoring Station.

Processing System

Figure 5:
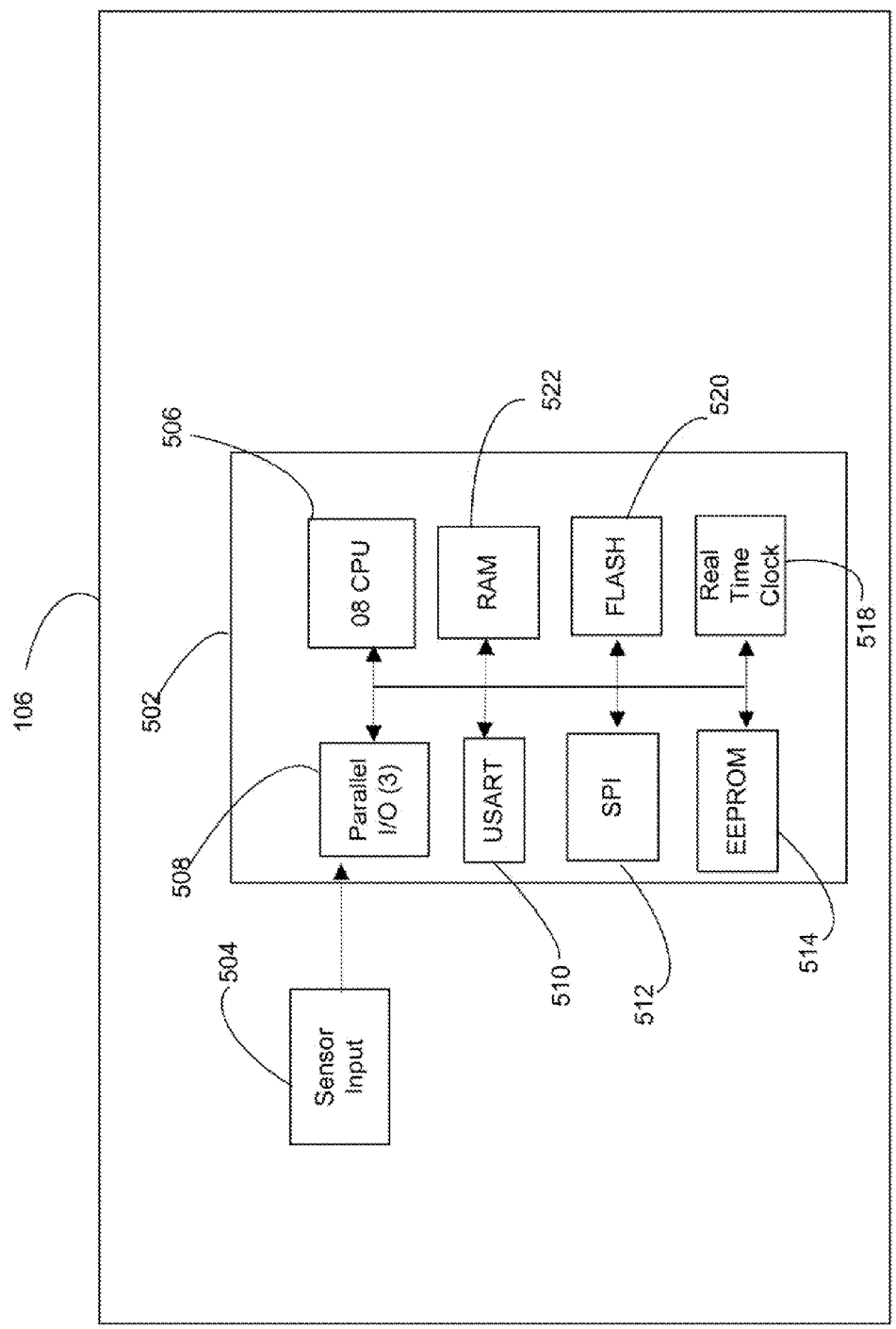
FIG. 5 is a block diagram of a sensor control unit according to an embodiment of the present invention

With reference now to FIG. 1 and FIG. 5, a first preferred embodiment of the processing system 106 of the present invention will now be discussed. As discussed above, it is preferable that the processing system 106 compare the sequence and threshold performance of the sensors 504 in the clusters to a set of predetermined patterns and levels derived from empirical trials on an instrumented static test container. Based on a series of rule sets stored in memory, the controller 502 then operates to declare security events and initiate recording and communication actions as programmed.

In operation, the controller 502 is preferably programmed to routinely scan the conditions of the sensors to ensure operability. It is further preferable that the controllers 502 have access to all other subsystem managers and provide control of the sensors, communications, power, and alerting functions. To achieve this function, as shown in FIG. 1, it is preferred that the controller 502 have access to and handle all of the system logging of sensor data on a sensor log 128 or similar medium.

Communication System

As further shown in FIG. 1, a wireless transceiver 114 in accordance with a preferred embodiment of the present invention, may be a wireless connection in a satellite mode to communicate with a satellite system such as Globalstar or Orbcomm. Preferably, such a satellite device will be a device such as the Axxon, AutoTracker, or the like, or a customized Orbcomm VHF satellite GPS tracking communications device which may be adapted with Zigbee interface antenna devices to incorporate them into the overall LAN architecture of the security system; these devices include a satellite transceiver, GPS receiver, a customized Zigbee wireless antenna with a serial (Ax Tracker) or duplex (OrbComm) interface.

In accordance with an alternative preferred embodiment of the present invention, the reporting may also be made using a wireless system independent from the satellite system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the Zigbee (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

Remote Monitoring

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data Interchange, XML, E-mail, HTML and flat text files. After receiving such data, the data fusion center preferably would act to process information to identify anomalies. With this data collected and processed, analyst may calculate statistics and probability of detection models used for decision support.

Figure 2:
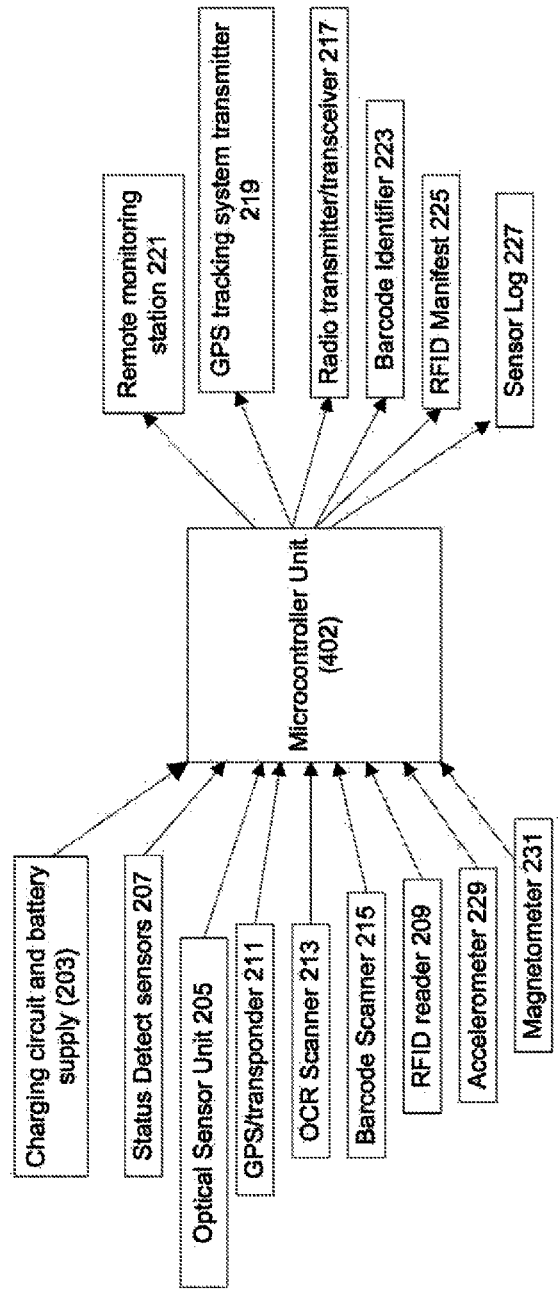
FIG. 2 is an electrical wiring diagram of a micro-processing unit according to an embodiment of the present invention.

With reference now to FIG. 2, an electrical wiring diagram of a microcontroller unit 106 according to an embodiment of the present invention will now be discussed. A microcontroller unit 106 receives input from a charging circuit and battery cells 203, a Optical Sensor unit 205, the status detect sensors 207, a GPS transponder 211, an accelerometer 229, a RFID reader 209, an OCR scanner 213, a barcode scanner 215 and a magnetometer 231. The controller 402 then assesses information and sends out signals to a radio transmitter/transceiver 312, a sensor log 118 and a remote monitoring station 221. Data from these sensors is processed, stored, and acted upon by the controller unit 502.

Figure 3:
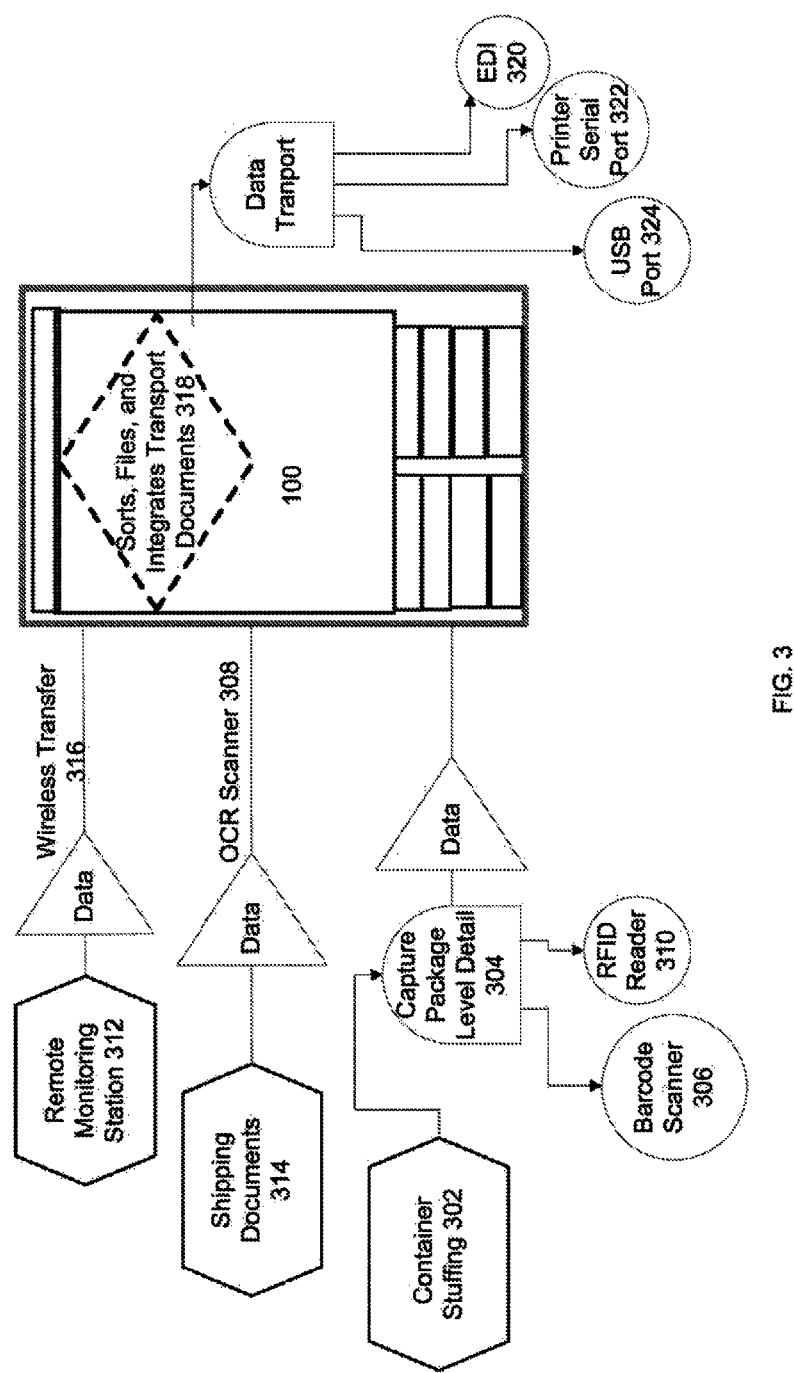
FIG. 3 shows a method for describing the flow of information within a system for managing shipping documents in accordance with an embodiment of the present invention.

With reference now to FIG. 3, a method for describing the flow of information within a system for managing shipping documents in accordance with an embodiment of the present invention will now be discussed. As shown in FIG. 3, as a container is loaded 302 it is preferred that package level detail is captured 304 by a RFID reader 310 detecting RFID tags on packages and a Barcode scanner 306 uploading barcodes. Further, as a container is loaded an electronic manifests may be transferred via wireless document transfer 316 from the Remote Monitoring Station 312 and/or shipping documents may be scanned 314 via the OCR Scanner 308 of the present invention. After data is transferred to the apparatus of the present invention 100, transport documents may sorted, filed, and integrated 318 to become a unified manifest for everything on or in a pallet or container. Finally, the documentation can be managed, reviewed, and delivered in complete, viewable, and organized shipping documentation folders and transferred through a USB port 324, an external serial port 322 and printer and/or Electronic Data Interchange (EDI) 320.

Figure 4:
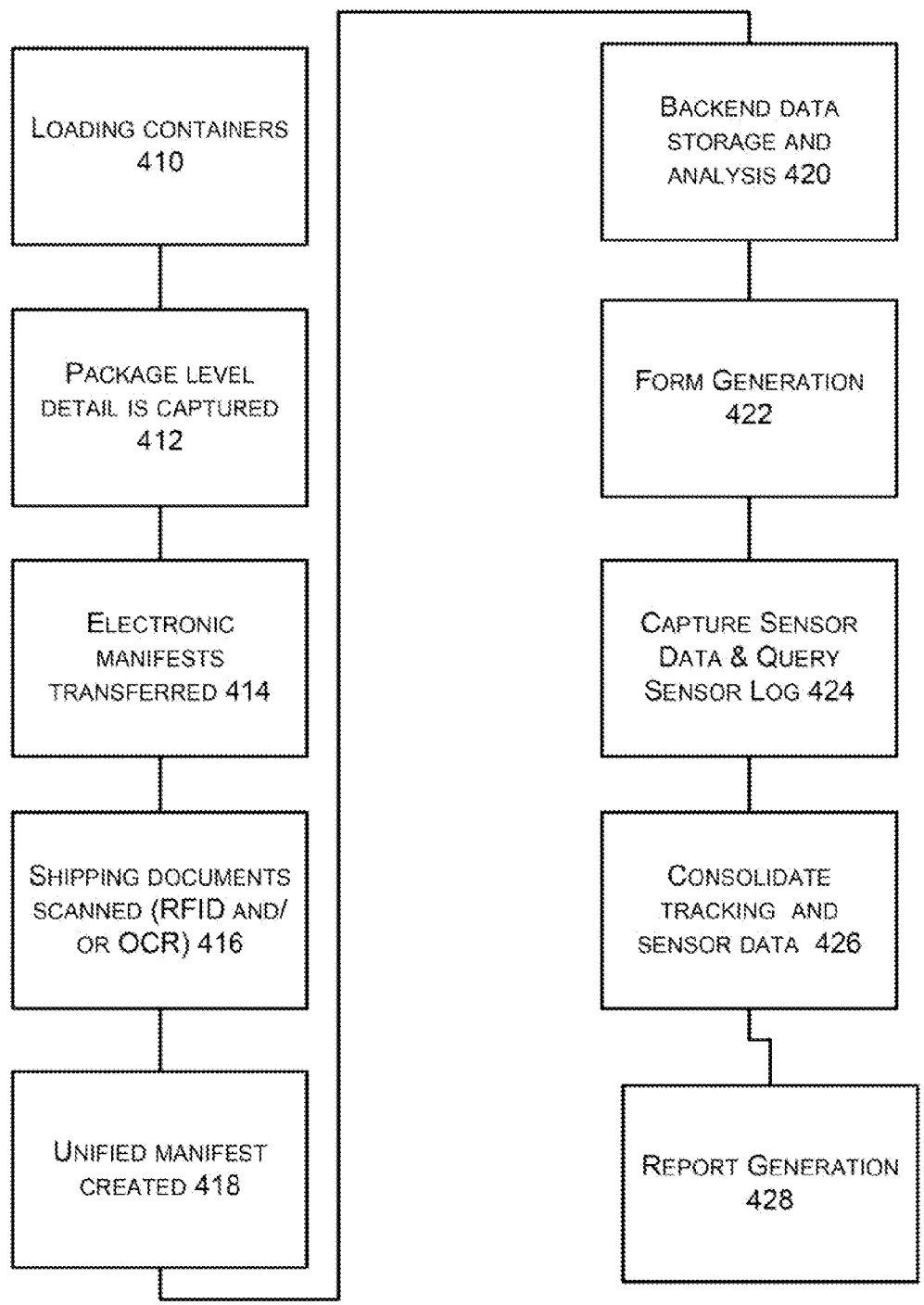
FIG. 4 show a method for creating an envelope of information applied to cargo transport documentation in accordance with an embodiment of the present invention.

With reference now to FIG. 4, a method for creating an envelope of information applied to cargo transport documentation in accordance with an embodiment of the present invention will now be discussed. As shown in FIG. 4, as the shipping container is loaded 410 the present invention captures package level detail 412. Preferably, an electronic manifest is wirelessly transferred and received by the processing unit of the present invention 414 or a copy of the manifest and/or other shipping documents may be manually uploaded by the OCR scanner of the processing unit. Preferably, according to one aspect of the present invention, the package level detail captured at loading can be reconciled to the shipping manifest. In accordance with the present invention, a unified manifest may be generated 418 and transmitted for backend data storage and analysis 420. In transit and especially at custom points, according to one aspect of the present invention, forms may be generated as needed by authorities 422. Documentation may be delivered in complete, viewable, and organized shipping documentation folders and transferred through a USB port, an external serial port and printer and/or Electronic Data Interchange (EDI). Preferably, in accordance with one aspect of the present invention, sensor data may be captured and the sensor log queried 424 by either the local user or the remote monitoring station. Preferably, tracking and sensor data may be consolidated with shipping documents 426 for generating complete tracking logs and other reports 428 based on actual sensor data collected during transit.

With reference now to FIG. 5, it is preferred that the controller unit 502 incorporates a microprocessor 506, a real time clock 518, a general purpose Input/Output port to support external peripheral control 508, a Universal Synchronous/Asynchronous Receiver Transmitter (USART) 510, a Serial Port Interface (SPI) 512, and memory such as RAM 522, FLASH memory 520, and EEPROM 514 as shown.

Preferably, the microprocessor 506 used may be a low power, high performance, eight-bit intergrated circuit based on the Motorola HCS08 instruction set. The controller 502 will preferably manage power and host the master date-time clock, communication scheduling and annotation of flash memory records.

Preferably, the present invention includes circuitry and digital ports to connect to existing electrical and sensor management systems previously configured with embedded circuitry. In operation, a controller unit 502 is preferably programmed to routinely scan the condition of each sensor to ensure operability.

What is claimed is:

1. A method for collecting and organizing transport documentation, the method comprising:
   loading a container;
   capturing package level data regarding the content of the container;
   receiving an electronic manifest data;
   creating a unified manifest including electronic manifest data and package level data;
   transmitting the unified manifest to a remote monitoring station for storage and analysis;
   generating forms as needed by authorities using data from the unified manifest;
   capturing sensor data regarding the transport condition of the container;
   querying sensor data log;
   consolidating sensor data with data from the unified manifest; and
   generating a tracking data report which includes sensor data and data from the unified manifest.

2. The method of claim 1, wherein the step of receiving electronic manifest data includes uploading the manifest by an OCR scanner of a processing unit.

3. An apparatus for collecting and organizing shipping information and documentation for producing and transmitting shipping documents, the apparatus comprising:
   an RFID reader configured to capture package level data loaded onto a shipping container;
   a processing element configured to receive electronic manifest data, wherein the electronic manifest data includes data regarding the identity of the shipping container, routing information and custody of the container contents; further wherein the processing element is further configured to create a unified manifest including electronic manifest data and package level data;
   a transmitting element, wherein the transmitting element is configured to transmit the unified manifest to a remote monitoring station for storage and analysis;
   a form generating element, wherein the form generating element is configured to generate and populate forms with data from the unified manifest; and
   a sensing system, wherein the sensing system is comprised of at least one sensor which is configured to capturing sensor data regarding the transport condition of the container;
   wherein the processing element is further configured to consolidating sensor data with data from the unified manifest; and further wherein the form generating element is further configured to generate a tracking data report which includes sensor data and data from the unified manifest.

4. The apparatus of claim 3, wherein the apparatus further comprises a display screen system for user level interaction.

5. The apparatus of claim 4, wherein the apparatus further comprises a geolocation transponder for providing geolocation information to the processing system.

6. The apparatus of claim 4, wherein the sensing system comprises at least one environmental sensor selected from the group of environmental sensors which includes: an accelerator, a magnetometer, and an optical sensor.

7. The apparatus of claim 6, wherein the geolocation transponder is selected from the group of geolocation transponders which includes: global positioning system, Wi-Fi location databases, and cellular network locator.

8. The apparatus of claim 4, wherein the processing system includes an OCR processing element.

9. The apparatus of claim 4, wherein the apparatus further comprises an open architecture processing and control system for communicating with existing container sensor systems.

10. The apparatus of claim 4, wherein the unified manifest data includes data regarding at least one shipping document selected from the following group of shipping documents: air freight waybills, an ocean waybill, a bill of lading, a straight bill of lading, a shipper's order bill of lading, a proof of ownership, a commercial invoice, a bill for the goods, a consular invoice, a certificate of origin, a NAFTA certificate of origin, an inspection certification, a dock receipt, a warehouse receipt, a destination control statement, a Shipper's Export Declaration (SED), a Shipper's Letter of Instructions, an export license, an export packing list, or an insurance certificate.

11. The apparatus of claim 4, wherein the form generating element is configured to prepare forms based on the content, copies or language required by the importing government.

12. The apparatus of claim 11, wherein the form generating element is configured to prepare forms based on the detected geolocation.

* * * * *